Sept. 5, 1939.   S. K. EDWARDS   2,171,743

FLASH LAMP SYNCHRONIZER

Filed Feb. 15, 1938

INVENTOR,
Stevenson K. Edwards
BY Barth & Barth
ATTORNEYS.

Patented Sept. 5, 1939

2,171,743

UNITED STATES PATENT OFFICE 2,171,743

FLASH LAMP SYNCHRONIZER

Stevenson K. Edwards, Oakland, Calif.

Application February 15, 1938, Serial No. 190,607

5 Claims. (Cl. 67—29)

The present invention relates to apparatus for synchronizing the operation of a camera shutter with the flash of a light, as in taking flash light photographs.

The principal objects of the invention are to provide a simple apparatus for the purpose described, which can easily be applied to existing cameras of different makes and sizes; which is positive in operation; which can be adjusted to provide perfect synchronization; and which can be used with any convenient source of electric current, either small batteries or the ordinary house lighting circuits, to flash any number of lamps which may be required for the desired illumination. Other objects and advantages of the invention will be apparent from the following specification, which should be read with the understanding that changes, within the scope of the claims hereto appended, may be made in the form, construction and arrangement of the several parts herein illustrated and described, without departing from the spirit of the invention.

In the drawing, Fig. 1 is a broken front elevation of a camera lens with a preferred form of my synchronizing apparatus associated therewith.

Figure 1:
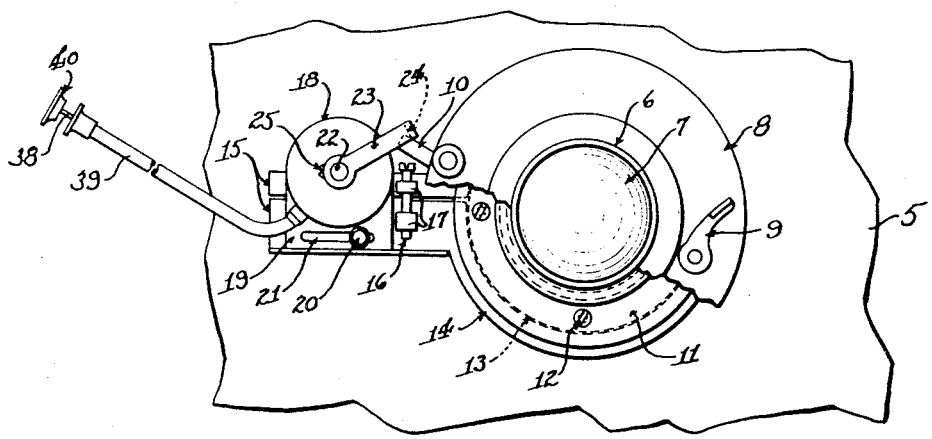
Figure 2:
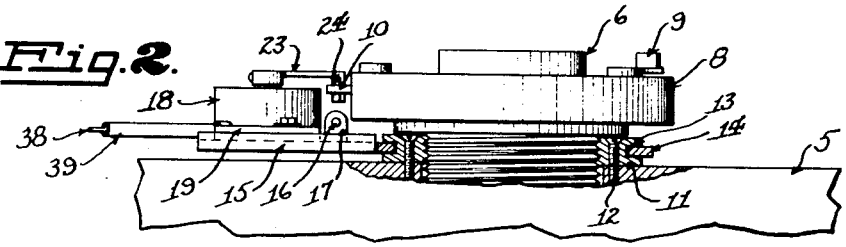
Fig. 2 is a part sectional side elevation of the same.

Referring more particularly to the drawing, the reference numeral 5 designates the front board or lens board of a camera, 6 is the lens barrel having a lens 7 therein, 8 is the housing enclosing the shutter mechanism, which is usually formed as an annular extension surrounding the lens barrel 6, 9 is the shutter setting lever, and 10 is the shutter release lever or trigger. These parts are common to practically all cameras. 11 is an annular flange secured in any convenient manner, as by screws 12, to the lens board 5, and interiorly threaded to receive the lens barrel. Some form of such a flange is also common to most cameras.

My invention contemplates a peripheral groove 13 in the lens flange 11, and a clamping ring 14 seated in said groove. The ends of said ring are formed with outward extensions 15, which are held together in suitable manner, as by a screw 16 passing through lugs 17. Tightening the screw 16 clamps the ring 14 and its extensions 15 securely and immovably upon the lens flange 11.

Figure 3:
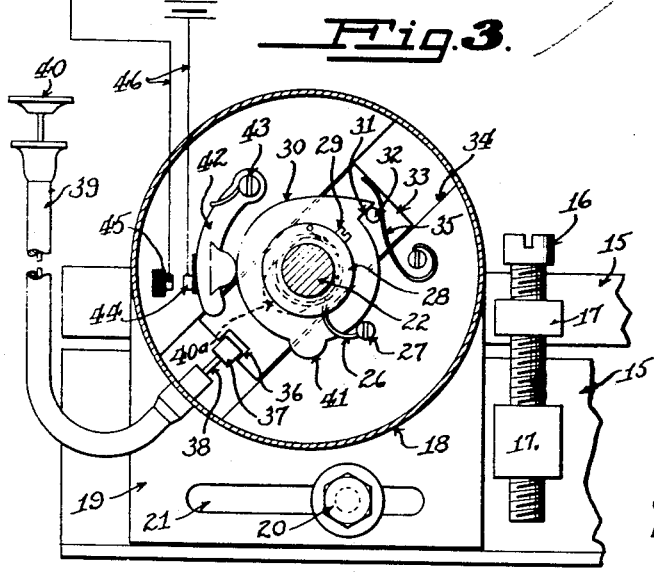
Fig. 3 is an enlarged sectional view of the synchronizing apparatus as seen from the front with the front of the housing removed.

A cylindrical housing 18 is mounted upon a flat base 19, said base being adjustably secured to one of the clamp extensions 15 by a clamping bolt 20 extending through a slot 21. A rotatable shaft 22 extends out of the front of the housing 18, and carries an arm 23 having an inwardly turned end 24 positioned to engage the shutter release trigger 10. The arm 23 is adjustably secured upon the shaft 22, as by means of a set screw 25. A spring 26 within the housing 18 tends to rotate the shaft 22 in the proper direction, i. e., clockwise as shown in Figs. 1 and 3, to cause the arm 23 to engage and move the trigger 10. The spring is preferably coiled around the shaft 22, and has one end engaging a fixed pin 27 and the other end engaging a collar 28 secured upon the shaft 22 by a set screw 29. By shifting said collar upon said shaft, the tension of the spring can be adjusted.

The shaft 22 has secured upon it a cam 30, which has a shoulder 31 positioned to engage a pin 32 projecting from a slide 33. The slide 33 is movable in a guideway 34 in the base 19, and is normally held by a spring 35 in the position shown in Fig. 3, so that the pin 32 engages the shoulder 31 and keeps the shaft 22 from rotating. The other end of the slide 33 is notched, as at 36, to receive the end 37 of a flexible push cable 38 of a common form, said push cable being inclosed in a flexible tube 39 and having an operating button 40 at its outer end. By pushing the button 40, the slide 33 is moved to release the pin 32 from the shoulder 31, permitting the shaft 22 to rotate, clockwise, until said shoulder strikes against the pin 27. During this movement of the shaft 22, the arm 23 engages the trigger 10, thereby operating the shutter of the camera. The slide 33 is provided with a slot 40a, through which the shaft 22 freely extends.

The cam 30 has a projection 41 which, during the movement of the shaft 22, engages a contact arm 42, pivoted at 43, and causes a contact point 44 on said arm to make electrical connection with a fixed contact point 45. The contact points 44 and 45 are connected by wires shown in diagram at 46, in an electrical circuit which includes a source of current indicated at 47 and one or more flash lamps indicated at 48. When the circuit is closed by the contact points 44 and 45, the lamp is flashed.

The shaft 22 is reset by moving the arm 23 counter-clockwise, by hand, until the shoulder 31 engages the pin 32. This resetting movement tightens the spring 26. Then when the button 40 is pushed, the slide 33 is moved to release the shaft 22, which rotates clockwise through about one quarter of a revolution, causing the contact points 44 and 45 to close the lamp circuit and flash the lamp, and at the same time causing the arm 23 to trip the shutter trigger 10 and release the shutter. The two operations of flashing the lamp and releasing the shutter are synchronized by properly adjusting the position of the arm 23 upon the shaft 22, but after this adjustment has once been made, exact synchronization is maintained indefinitely.

It should be noted that the release and operation of the shutter is made by positive mechanical means, and is not dependent upon electric mechanism. Therefore, the shutter will always operate, and there is no possibility of wasting a flash lamp because of failure of the shutter to operate. If the lamp fails to flash, due to weak batteries or faulty connections, no harm is done.

The contact points 44 and 45 are heavy enough and well enough insulated to handle sufficient current and voltage to flash a number of lamps at once, and the ordinary 110 volt lighting current can be used with safety.

The device is adaptable to any camera having a shutter release or shutter operating trigger, and can be mounted on most cameras mereby by substituting a peripherally grooved lens flange as shown at 11, for the usual lens flange provided with the camera.

I claim:

1. In a camera having a shutter operating trigger, a rotatable shaft, an arm carried by said shaft positioned to engage and operate said trigger, a spring for rotating said shaft, a cam member carried by said shaft, said cam member having a shoulder, a movable slide having a slot through which said shaft extends, means on said slide positioned to engage said shoulder to hold said shaft stationary, means for moving said slide to release said shoulder, and electric contacts operated by said cam member to close an electric circuit synchronously with the operation of the shutter for the purpose of flashing a lamp.

2. In a camera having a lens mounting provided with a peripheral groove and a shutter operating trigger, a clamp surrounding said mounting in said groove, said clamp being angularly adjustable about the axis of said mounting, movable means carried by said clamp positioned to engage and operate said trigger, and electric contacts operated by said movable means to close an electric circuit synchronously with the operation of the shutter for the purpose of flashing a lamp.

3. In a camera having a lens board, a lens mounting, and a shutter operating trigger; a flange secured to said lens board, said lens mounting being removably carried by said flange, a clamp member mounted on said flange for angular adjustment about the axis of said lens mounting, movable means carried by said clamp positioned to engage and operate said trigger, and electric contacts operated by said movable means to close an electric circuit synchronously with the operation of the shutter for the purpose of flashing a lamp.

4. In a camera having a lens board, a lens mounting, and a shutter operating trigger; an annular flange secured to said lens board and provided with a peripheral groove, said lens mounting being removably carried by said flange, a clamp surrounding said flange in said groove, said clamp being angularly adjustable about the axis of said mounting, movable means carried by said clamp positioned to engage and operate said trigger, and electric contacts operated by said movable means to close an electric circuit synchronously with the operation of the shutter for the purpose of flashing a lamp.

5. In a camera having a shutter operating trigger, a housing, a rotatable shaft having an end portion projecting from said housing, an arm carried by the projecting portion of said shaft, said arm being positioned to engage and operate said trigger, a spring for rotating said shaft, a cam member carried by said shaft within said housing, said cam member having a shoulder, a slide within said housing, said slide being movable in a direction at right angles to the axis of said shaft and having a slot through which said shaft extends, means on said slide positioned to engage said shoulder to hold said shaft stationary, means for moving said slide to release said shoulder, and electric contacts operated by said cam member to close an electric circuit synchronously with the operation of the shutter for the purpose of flashing a lamp.

STEVENSON K. EDWARDS.